United States Patent [19]

Koegler

[11] Patent Number: 5,282,685
[45] Date of Patent: Feb. 1, 1994

[54] ELECTRONIC THERMOMETER WITH REDUNDANT MEASURING CIRCUITS AND ERROR DETECTION CIRCUITS

[75] Inventor: John H. Koegler, Pattersonville, N.Y.

[73] Assignee: Anderson Instrument Company, Inc., Fultonville, N.Y.

[21] Appl. No.: 818,883

[22] Filed: Jan. 10, 1992

[51] Int. Cl.⁵ .............................................. G01K 7/24
[52] U.S. Cl. .................................... 374/172; 374/183; 340/515; 340/584
[58] Field of Search ............... 374/128, 166, 170, 172, 374/183; 307/310; 340/508, 515, 584, 585, 587, 589, 511

[56] References Cited

U.S. PATENT DOCUMENTS

| | | | |
|---|---|---|---|
| 3,472,073 | 10/1969 | Irani | 374/172 |
| 3,760,393 | 9/1973 | Lindberg | 340/508 |
| 4,133,700 | 1/1979 | Hollander et al. | 340/515 |
| 4,144,458 | 3/1979 | Doherty | 340/515 |
| 4,183,248 | 1/1980 | West | 374/170 |
| 4,195,286 | 3/1980 | Galvin | 340/587 |
| 4,300,392 | 11/1981 | Bloomer et al. | 374/172 |
| 4,380,155 | 4/1983 | Paddock et al. | 374/170 |
| 4,771,393 | 9/1988 | Ishida et al. | 374/170 |
| 4,901,061 | 2/1990 | Twerdochlib . | |
| 4,926,364 | 5/1990 | Brotherton . | |
| 5,116,136 | 5/1992 | Newman et al. | 374/170 |
| 5,172,099 | 12/1992 | Glaser | 340/587 |

FOREIGN PATENT DOCUMENTS

| | | | |
|---|---|---|---|
| 122489 | 10/1984 | European Pat. Off. | 340/515 |
| 59-7229 | 1/1984 | Japan | 374/172 |
| 1379539 | 1/1975 | United Kingdom | 374/172 |

Primary Examiner—William A. Cuchlinski, Jr.
Assistant Examiner—G. Bradley Bennett
Attorney, Agent, or Firm—Nixon & Vanderhye

[57] ABSTRACT

An electronic thermometer for use in food and dairy processing is disclosed. The thermometer utilizes a passive trimming circuit in conjunction with high quality Resistive Temperature Devices (RTDs), along with four-wire measurement circuitry to create an extremely accurate signal so that all probes are interchangeable and require no adjustment to maintain accuracy. The current source is modulated to linearize the RTDs response over a broad temperature range. To substantially eliminate the possibility of false temperature readings, dual RTDs and redundant electronic circuitry are employed, along with a detection circuit which will blank out the display should an error be detected. To prevent undue display blanking, a rapid temperature change sensing circuit will temporarily override the display blanking feature.

4 Claims, 4 Drawing Sheets

ELECTRONIC THERMOMETER WITH REDUNDANT MEASURING CIRCUITS AND ERROR DETECTION CIRCUITS

BACKGROUND AND SUMMARY OF THE INVENTION

This invention relates to electronic thermometers and is suited to most temperature measurement applications. In particular, the invention is applicable to thermometers used in food and dairy processing plants.

Food and dairy processing requires accurate and reliable temperature measurements. Many food and dairy processes are highly dependent on controlled temperatures. For example, pasteurization of dairy products must be conducted at a sufficiently high temperature to destroy particular microorganisms, but not too hot so as to waste energy or destroy the dairy product. If the prescribed temperature is not achieved, then the dairy product may contain salmonella or other harmful bacteria. Similarly, refrigerated processes cool food to inhibit spoilage. The temperature of the refrigerator must be monitored to prevent food spoilage. Accurate thermometers are needed to ensure that the food products are heated or cooled to the proper temperature. Thermometers must accurately indicate the food temperature so that the processing of food and dairy products is conducted safely and properly.

Thermometers are the by far the most common means for monitoring the temperature of foods and dairy products. The operators of processing plants rely on thermometers to accurately display food and dairy temperatures. If a thermometer displays an erroneous temperature, food can spoil without the knowledge of the operator. The spoiled food and dairy products may be unknowingly distributed for human consumption. Because of the danger that spoiled food and dairy products may reach consumers, thermometers used in food and dairy processing plants must be reliable and accurate.

Thermometers for food and dairy processing plants generally are mercury thermometers. Mercury thermometers are reliable and are relatively free of erroneous readings. The U.S. Food and Drug Administration has approved mercury thermometers for use in food and dairy processing. However, when mercury thermometers break, mercury and glass can contaminate the food and dairy products.

While electronic thermometers have long been available, they have not been approved for all food and dairy processing until the present invention. Electronic thermometers can malfunction and display erroneous temperature readings. Their use has been limited to non-critical applications. Examples of electronic thermometers are disclosed in the following references:

| U.S. Patent No. | Patentee |
| --- | --- |
| 4,901,061 | Twerdochlib |
| 4,771,393 | Ishida |
| 4,586,146 | Stillman |
| 4,183,248 | West |
| 3,882,728 | Wittlinger |

This invention provides an electronic thermometer for use in food and dairy processing. The thermometer utilizes a passive trimming circuit in conjunction with high quality resistive temperature devices (RTD) and a modulated current source to produce a linear response over a broad temperature range. The thermometer has several electronic circuits that reduce the likelihood of errors, error detection circuits that shut off the temperature display when an error is detected, and circuits to ensure that rapid temperature changes do not result in false error signals. The combination of these circuits yields a highly reliable and accurate thermometer safe for use in food and dairy processing.

In its preferred embodiment, the current invention comprises an elongated probe housing a pair of redundant RTD temperature sensing elements. Passive trimming circuits allow each RTD to be calibrated to the same reference resistance profile standard. The temperature signals from both sensing circuits are carried by cabling to an instrument housing. The instrument housing contains electronic circuits that process the temperature signals. A pair of redundant measuring circuits each individually interpret the temperature signals and calculate a temperature reading. The display circuit uses dual-slope integration and crystal control for stability. Also, the signal and reference voltages needed to display F° and C° are routed through field effect transistor (FET) switches rather than a mechanical device to eliminate the possibility of error due to contact deterioration.

The measuring circuits are monitored by a differential amplifier that compares the temperature readings of both measuring circuits. If the difference between the two temperature readings exceeds a predetermined threshold level, then the thermometer display becomes blank to prevent the display of erroneous readings. Similarly, the display goes blank when the temperature reading is outside of the range of thermometer.

The differential circuit detects any variations in the temperature readings of the pair of measuring circuits. However, not every variation is indicative of an error. When the thermometer is rapidly adjusting to a new temperature, the transition can cause a temporary imbalance between the pairs of temperature sensing elements and measuring circuits. This temporary imbalance dissipates once the thermometer adjusts to the new temperature. Accordingly, the error detecting differential circuit is disabled and the display does not blank out while the temperature measurement signals change rapidly.

The circuit that inhibits the error signals during rapid temperature changes has failsafe features. If this circuit fails high or fails low, it will not inhibit error signal even during rapid temperature changes. In addition, a test button is provided on the thermometer for simulating a rapid temperature change. Depressing this test button allows the thermometer operator to check that the thermometer and its safeguards are operating properly.

It is an objective of the current invention to provide an electronic thermometer that reliably and accurately displays temperatures. Another objective is to provide a series of safeguards within the thermometer to detect malfunctions and disable the thermometer. An additional objective is to provide a passive temperature probes that are so precise that they are interchangeable and replaceable with no adjustments. After a probe is replaced, the displayed temperature still remains accurate for the entire specified range of the instrument. These and other objectives of this invention are apparent from the description contained within this specification.

BRIEF DESCRIPTION OF THE ACCOMPANYING DRAWINGS

Reference is made to the accompanying drawings that bear the reference numerals used in this specification to denote the structural elements of the disclosed embodiments of this invention. These drawings are:

DETAILED DESCRIPTION OF THE PREFERRED EXEMPLARY EMBODIMENTS

Figure 1:
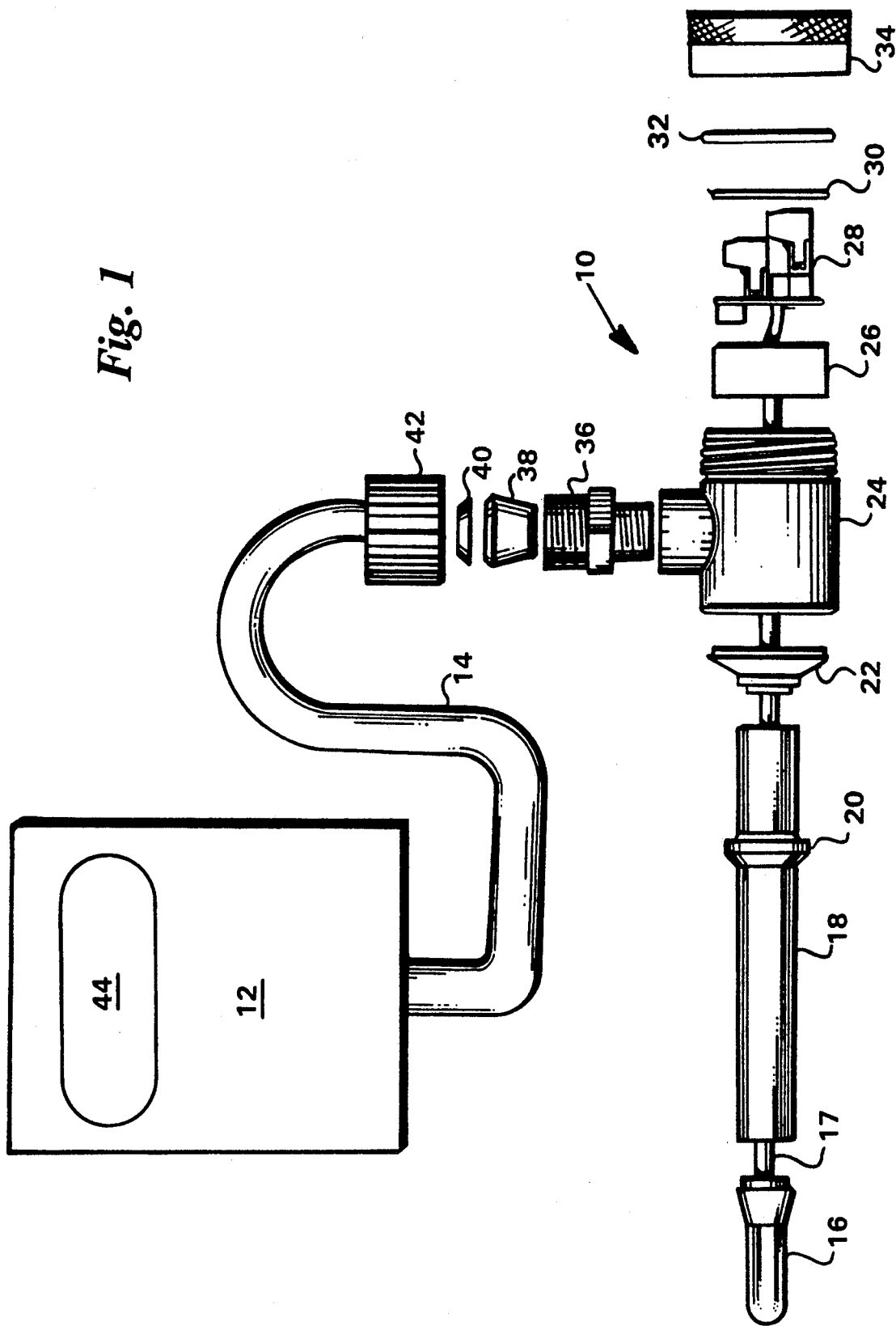
FIG. 1 is an exploded view of a first embodiment of the temperature measuring probe shown in conjunction with the instrument housing.

FIG. 1 shows an exploded view of a first embodiment of a temperature measuring probe 10 coupled to an instrument housing 12 via cabling 14 carrying signal wires (not shown). The probe components include a nose bulb 16 at the front of the probe that contains the pair of RTD electronic temperature sensors (shown in FIG. 2). The nose bulb shields the sensors from the processes being measured and provides sufficient heat transfer so that the sensors are promptly exposed to the temperature of the process. Conductive wires 17 carry the source current to and from the sanitary sealing through an elongated tube 18 having a shoulder connection 20 which mates with a fitting on process equipment to prevent leakage.

The tube 18 connects to an adaptor 22 that forms one end of a sleeve connector 24 for the probe. The spacer retaining ring 26 supports the RTD trimming circuit board 28 within the sleeve connector. The spacer ring and circuit board are retained by a snap ring 30. The "O" ring gasket 32 provides a seal between cap 34 and the sleeve connector. The cabling 14 is coupled to the sleeve connector by means of threaded adaptor 36 that screws into the connector and receives a cap 42. This cap securely holds the end of the cabling by means of a annular retainer 38 and an annular sleeve 40. Accordingly, the entire probe is sealed so that moisture does not seep into the probe and disrupt its electronic components.

The trimming circuits are electrically coupled to the instrument housing 12 via conductive wires in cabling 14. The instrument housing contains a conventional digital display 44 supported by display circuits that show temperature readings, error signals and other information.

Figure 2:
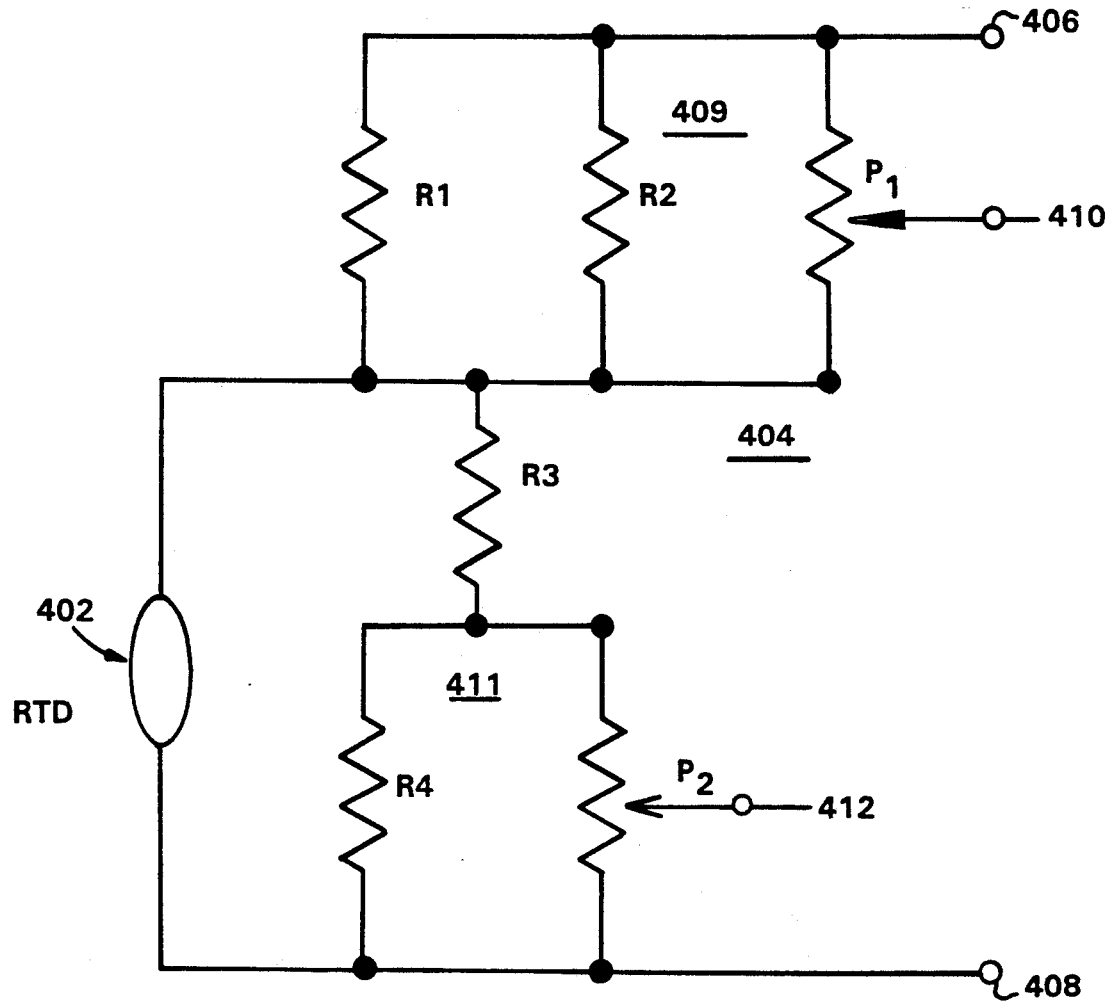
FIG. 2 is a schematic diagram of the RTD temperature sensor and trimming circuit.

FIG. 2 is a schematic illustration of a single resistance temperature device (RTD) 402 and its associated trimming circuit 404. A pair of RTDs are positioned in the bulb 16 of the probe. The RTD in the preferred embodiment is a platinum RTD having an electrical resistance that changes in a logarithmic pattern in response to temperature changes. A modulated current is applied to the RTDs through interface leads 406 and 408 of the trimming circuit. The current is modulated by the temperature measurement signal as is explained below. The current passes through to the RTD via a first variable resistor circuit 409 having two low resistive parallel resistors R1 and R2 and a high resistance potentiometer P1 (a 20K Ohm potentiometer in parallel with a 20 Ohm and 365 Ohm resistor in parallel in the preferred embodiment). The RTD is coupled in series with the first variable resistor circuit and in parallel with the second variable resistor circuit 411. This second variable resistor circuit 411 includes resistor R3 (280K Ohm) coupled in series to a parallel circuit having potentiometer P2 (20K Ohm) and resistor R4 (4.32K Ohm).

The temperature signal from the RTD is taken as the voltage difference across the wipers 410 and 412 of the first and second potentiometers P1 and P2. The temperature response of the RTD is represented by a span curve. The span curve for a platinum RTD is non-linear logarithmic. In the preferred embodiment the span curve changes a rate of approximately 2 ohms for each degree Fahrenheit. The non-linearity of the span curve is linearized by modulating the source current through the RTD, as is shown in FIG. 3 and explained below.

The RTD current passes through the first resistor circuit comprising R1, R2, and P1 to produce an offset voltage, any portion of which may be sampled at the wiper of P1. In the preferred embodiment, potentiometer P1 is adjusted to calibrate the RTD at the freezing point of water. The span (response to temperature) of each RTD varies slightly. Accordingly, potentiometer P2 (which is in parallel with the RTD) is adjusted to normalize the span curve of each RTD.

The current passes from the offset circuit to the RTD. Since the resistance of the RTD is a function of its temperature. The specific voltage drop across the RTD is also a function of temperature. This voltage drop is the signal applied to the series/parallel circuit comprised of R3, R4, P2, a small amount of which will be across P2. Any portion of the signal across P2 may be sampled at its wiper, and therefore, P2 is the span trim adjustment. The four-wire measurement circuitry consists of a current loop (connections 406 and 408) and a signal return (connections 410 and 410). Because the loop resistance (the RTD circuit and the lead wire) does not affect the loop current, and because the signal from P1 and P2 has no load, the lead wire may be almost any length with minimal effect on accuracy.

Figure 3A:
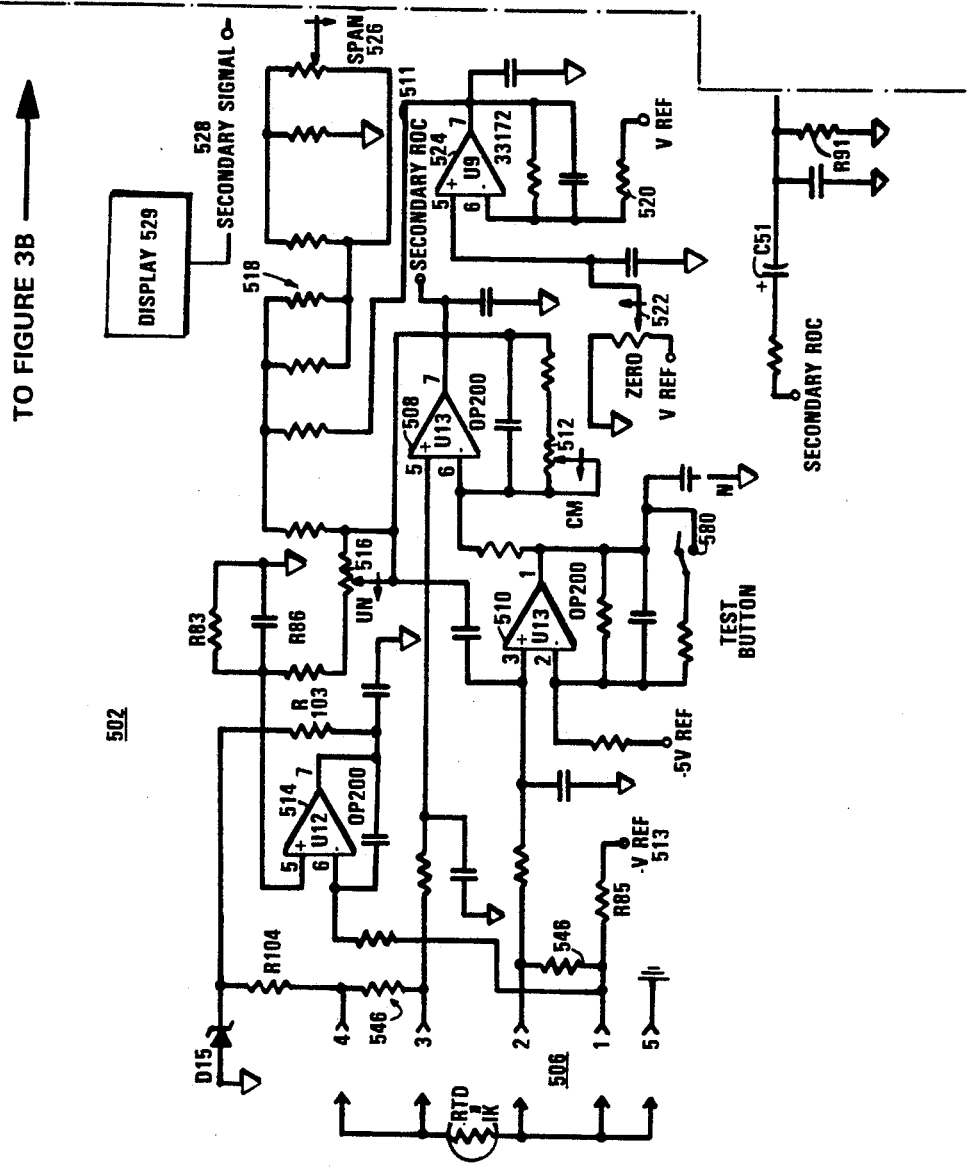
FIG. 3A and 3B are a schematic diagram of the electronic circuits for temperature measuring and error detection.
Figure 3B:
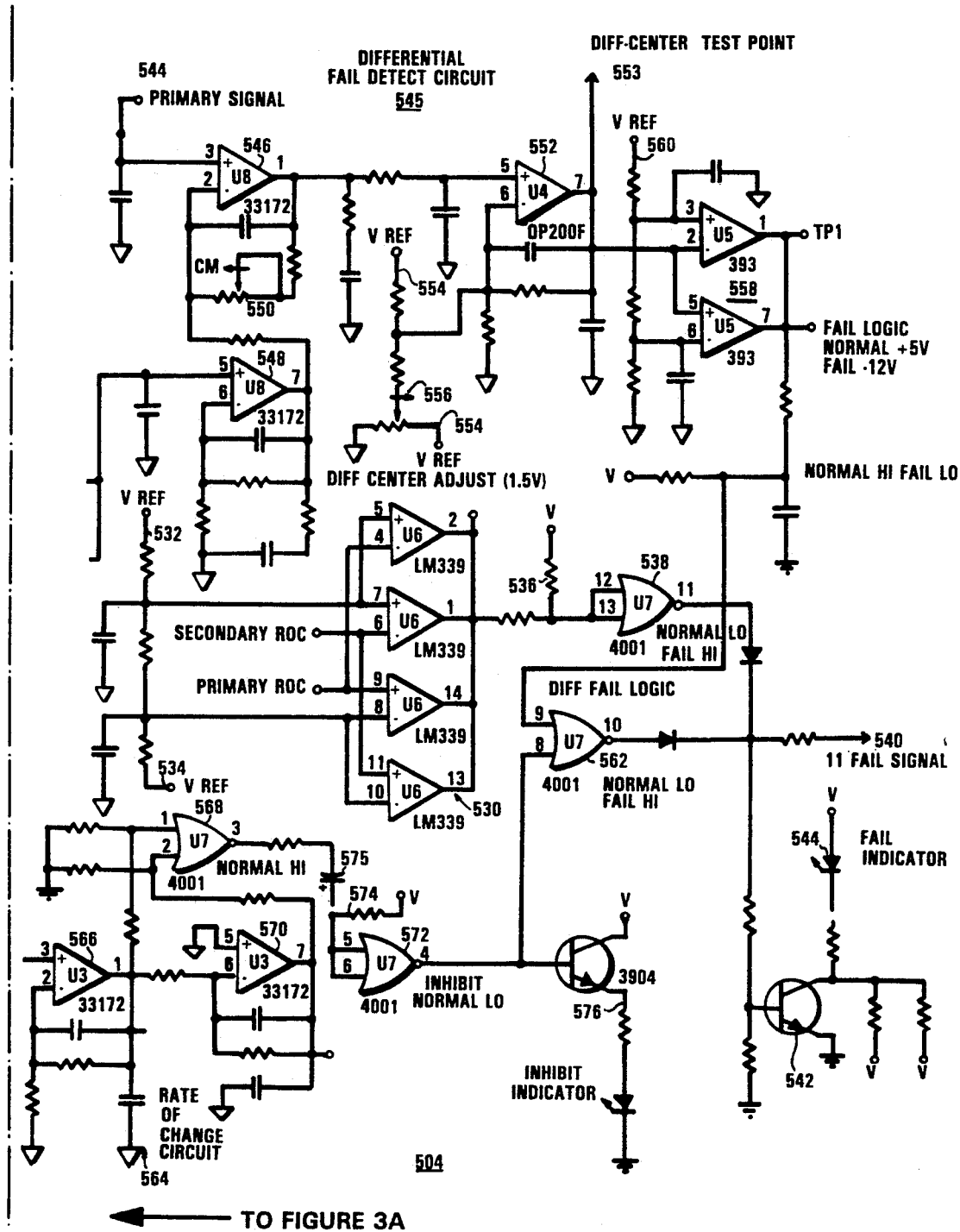

FIG. 3 is a schematic circuit diagram of temperature measuring 502 and failure detection 504 circuits. There is a four wire coupling 506 between each RTD trimming circuit and the temperature measuring circuit. The four wires provide a wire pair (leads 1 and 4) for the current source and a wire pair (leads 2 and 3) for measuring the voltage differential across the potentiometers in the trimming circuit.

There are two (primary and secondary) temperature measuring circuits 502. Only one (secondary) temperature measuring circuit is illustrated for simplicity but both circuits are substantially identical. The temperature signal from the trimming circuit (the voltage across the wipers of potentiometer P1 and P2) is fed to a differential amplifier U13 508. Lead 3 of the RTD interface 506 connects the trimming circuit to pin 5 of U13 508. Lead 2 of the RTD interface connects the trimming circuit to pin 3 of amplifier U13 510. The second input (pin 2) to amplifier 510 is coupled to a negative reference voltage and to a feedback circuit. The output of amplifier 510 is fed to pin 6 of amplifier 508. The differential amplifier 508 operates in common mode and a common mode (CM) potentiometer 512 ensures balanced operation of the amplifier. Capacitors throughout the circuit ground the amplifiers to shield the circuit from radio frequency (RF) interference.

Amplifier 508 generates a temperature signal at its output and is shown as Secondary ROC 511. This notation of Secondary is merely a reference to the second of two temperature measuring circuits, one for each of the two RTD circuits. FIG. 3 also refers to Primary ROC and Primary Signal which relate to the other temperature measuring circuit.

The temperature signal Secondary ROC is used for several purposes including to modulate the current source. The RTD exhibits a nonlinear response to temperature changes. The temperature response as measured across potentiometer wipers 410, 412 (FIG. 2), is linearized by modulating the source current through the RTD with the secondary ROC temperature signal. The current source passes through the RTD trimming circuit (FIG. 2) and back to lead 1 of the RTD interface 506, and is returned to a negative reference voltage 513 via a current sense resistor R85. The voltage thus developed is fed to pin 6 of amplifier 514 which serves as the current source for the RTD circuit (FIG. 2).

The reference voltage for the current source 514 (pin #5) is sourced through resistor R83 to signal ground. A small amount of the secondary ROC signal 511 passes through the linearity adjustment 516 through R86 and to R83 to produce a modulated ground reference for the current source 514. Proper adjustment of the linearity adjustment 516 will result in the proper modulation to counteract both the RTDs inherent non-linearity, and the additional non-linearity created by the load of circuit 411 (FIG. 2) upon the signal created by the RTD itself. The circuit 411 adds additional non-linearity because the RTDs impedance changes with temperature and the load imposed by circuit 411 is a constant. There is a protection circuit between output (pin #7) 514 and interface 506 (lead #4) consisting of two resistors R103 and R104, and a Zener diode D15.

The Secondary ROC signal is processed by a network of resistors 518. An offset voltage is applied to this network by a zero adjust circuit 520. The zero adjust circuit includes a zero potentiometer 522 that allows the thermometer to be calibrated at a preselected temperature, such as the freezing point of water at 0° C. The zero potentiometer and the potentiometer wiper is buffered by amplifier 524 whose output impedance is held constant to prevent zero-span interaction. The zero adjust offset voltage pulls down the Secondary signal via network 518 to the extent needed to calibrate the signal. Similarly, the resistor network 518 includes a span potentiometer 526 that is adjusted to account for tolerance variations in the differential amplifier, resistors and other circuit elements. At the output of the network 518 is the true temperature signal 528 (Secondary Signal and Primary Signal in FIG. 3) which is the temperature signal provided to a conventional digital display circuit 529 and displayed by the thermometer. In the preferred embodiment, only one of the Secondary and Primary Signals need be routed to the display circuit. However, access may be provided to display both signals for calibration and test purposes.

The electronic circuit of the thermometer has several means to detect failure and is constructed so that failure will not cause a false temperature reading. The first failure detection circuit is a bank of four comparators (amplifiers U6) 530. These comparators ensure that both initial temperature signals (Primary and Secondary ROC) are within a predetermined range. A failure signal is generated if either signal is outside of this range. The range is established by reference voltages 532, 534 which are applied to one input of each of the four comparators U6. The other inputs to the comparators receive the temperature signals. If either ROC signal is beyond the prescribed range, such as might occur when the RTD lead wires experience a short or open circuit, then a voltage is dropped across resistor 536 and, thus, causes NOR gate U7 538 to go high. A high signal from this NOR gate is passed to the display circuit as a fail signal 540 that blanks out the temperature display. The high signal is also applied to the base of transistor 542 to turn on a light emitting diode 544 which is a visible failure indicator.

To safeguard against false readings caused by an open signal line from RTD to interface 506 (leads 1, 2, 3, 4), high ohm resistors 546 (5.1M Ohm resistors in the preferred embodiment) cause the otherwise floating differential amplifier to go off scales when the circuit is open. Thus, the comparators 530 generate a failure signal. But for these high ohm resistors, the differential amplifiers 508, 510 might drift within the acceptable range of the thermometer and report false temperature readings. During normal operation, these high Ohm resistors have almost no voltage across them and have a negligible effect on the signal.

Another failure detection circuit 545 monitors the difference between the primary 544 and secondary 528 temperature signals. If the difference between these signals exceeds a preselected threshold, e.g. one half of a degree, then an intermediate failure signal is generated. The primary signal 544 and the secondary signal 528 are applied to differential amplifiers U8 546 and 548. A common mode adjustment 550 is provided to balance the differential amplifier comprised of 546 and 548 to reject the common mode portion of the signal over the range of the thermometer. The output of the differential amplifier on pin 1 of amplifier 546 is a signal representing the difference between the primary and secondary signals. This difference signal is applied to amplifier U4 552 which also receives an offset voltage input from a reference voltage 554 and a differential center adjust potentiometer 556. This potentiometer is adjusted by viewing the display of the differential center test point 553 taken from the output pin of amplifier U4 552.

The amplified signal with voltage offset from amplifier 552 is applied to a comparator U5 558. The difference signal is compared to a reference voltage 560 to ensure that the signal is within a preselected variance range. In the preferred embodiment, this range corresponds to a maximum variation of one half of one degree Fahrenheit over the entire temperature range of the thermometer. If the difference signal is outside of the preselected variance range, then the output of comparator U5 558 goes low.

The output of comparator U5 558 is applied to the NOR gate U7 562. This NOR gate is high under normal operating conditions. However, the gate produces a low signal output when comparator U5 goes low, if the second NOR gate input is also low. This second gate input inhibits the intermediate failure signal from the differential failure detection circuit 545.

The differential failure detection circuit is inhibited while the thermometer is rapidly changing temperature. During this rapid change, the RTDs may not be heated uniformly. The RTDs may adjust to the new temperature at different rates. During this temperature adjustment period the primary and secondary temperature signals may vary beyond the variance range imposed by comparator 558. While the comparator yields a failure signal, the thermometer has not failed but is merely responding to a new temperature. The thermometer inhibits the differential failure detection circuit 545 during rapid temperature changes to prevent unnecessary failure signals.

A rate of change circuit 564 monitors the rate of change of one of the temperature signals. In the preferred embodiment, the secondary ROC temperature signal is passed through a high pass filter, capacitor C51 and resistor and R91. Steady secondary ROC signals or signals changing slowly are grounded by this filter. Abrupt changes in the secondary ROC signal pass through the filter and are applied to the high gain operational amplifier 566. The output of amplifier 566 is routed to pin 1 of NOR gate U7 568 and to the inverting input of amplifier U3 570. Amplifier U3 570 responds to rapidly falling temperature by changing the logic level applied to pin #2 of NOR gate 568. The NOR gate normally generates a high signal, but generates a low signal when amplifier 566 or amplifier 570 generates a positive input signal. The greater the change in temperature, the longer the NOR gate 568 remains low and, thus, the longer the inhibit period. A low output from NOR gate 568 causes NOR gate 572 to go high. The high going output of NOR gate 572 is applied to the second input to NOR gate 562 to inhibit the differential failure detection circuit.

To ensure that the rate of change circuit 564 does not itself fail and thereby generate a perpetual inhibit signal, capacitor 575 and high resistance resistor 574 connected to the logic supply voltage form an RC circuit that causes NOR gate 572 to go low if too much time elapses during the inhibit period. In addition, during the inhibit period an inhibit indicator 576 lights to notify the operator of the inhibit.

A test button 580, when pushed, simulates a rapid temperature change in one of the temperature measurement circuits. This button allows an operator to test the rate of change and inhibit circuits. The test button drives differential amplifier 510 and thereby simulates a rapid temperature change. In the preferred embodiment, the test button abruptly changes Secondary ROC which is inputted to the rate of change circuit 564.

The invention has been described in what is presently considered to be the most practical and preferred embodiment. The invention is not limited to the disclosed embodiments. Rather, it covers various modifications and equivalent arrangements included within the spirit and scope of the appended claims.

What is claimed is:

1. A temperature responsive circuit comprising:
a plurality of temperature measuring circuits, each measuring circuit generating separate temperature signals;
failure detection means for issuing a failure signal when the variance between said temperature signals exceeds a threshold level, and
failure detection inhibit means for inhibiting said failure detection means when at least one of said temperature measuring circuits generates a rapidly changing temperature signal, wherein the inhibit period is proportional to the rate of change of said temperature signal.

2. A temperature responsive structure comprising:
a plurality of temperature measuring circuits, each measuring circuit generating separate temperature signals;
a failure detection circuit issuing a failure signal when the variance between said temperature signals exceeds a threshold level,
a failure detection inhibit circuit for inhibiting said failure detection circuit when at least one of said temperature measuring circuits is generating a rapidly changing temperature signal, and
a test button circuit coupled to at least one of said temperature measuring circuits, said test button circuit when activated causes a rapidly changing temperature signal to test the operation of said failure detection inhibit circuit.

3. A temperature responsive circuit comprising:
a first variable resistance circuit receiving a current and comprising a first variable resistance element having a resistance substantially greater than the resistance of a first circuit element parallel to said first variable resistance element, said first variable resistance circuit having an adjustable output;
a temperature responsive resistive element in series with said first variable resistance circuit;
a second variable resistance circuit in parallel with said temperature responsive resistive element comprising a second variable resistance element in parallel with a second resistive element, and a third resistive element in series with said second variable resistor, said second variable resistor having an adjustable output,
wherein the voltage difference between the outputs of said first and second variable resistance element is representative of the temperature varying resistance of said temperature responsive resistive element, and the output of said first variable resistor is adjusted to offset the voltage difference and the output of said second variable resistance element is adjusted to affect the temperature response of said temperature responsive circuit.

4. A temperature responsive circuit comprising:
a current source coupled to a first resistance circuit;
said first resistance circuit comprising a first variable resistance element having a resistance substantially greater than the resistance of a first circuit element parallel to said first variable resistance element, said first variable resistance circuit having an adjustable resistance contact providing an output;
a temperature responsive resistive element in series with said first resistance circuit;
a second resistance circuit in parallel with said temperature responsive resistive element comprising a second variable resistance element in parallel with a second resistive element, and a third resistive element in series with said second variable resistance element, said second variable resistance element having an adjustable contact providing an output,
wherein the potential difference between the outputs of said first and second variable resistance elements is representative of the temperature varying resistance of said temperature responsive resistive element, and the contact of said first variable resistor is adjusted to offset the potential difference and the contact of said second variable resistance element is adjusted to affect the temperature response of said temperature responsive circuit.

* * * * *

UNITED STATES PATENT AND TRADEMARK OFFICE
CERTIFICATE OF CORRECTION

PATENT NO. : 5,282,685
DATED : February 1, 1994
INVENTOR(S) : John H. Koegler, Jr.

It is certified that error appears in the above-indentified patent and that said Letters Patent is hereby corrected as shown below:

Col. 4, ln. 35, "connections 410 and 410" should read:

--connections 410 and 412--.

In Figure 3A, element 516 should be labeled "LIN" instead of "UN".

In Figure 3A, the ground connection (5) for the RTD should not be shown on same line as leads 1 to 4.

Signed and Sealed this

Twenty-sixth Day of July, 1994

Attest:

BRUCE LEHMAN

*Attesting Officer*     *Commissioner of Patents and Trademarks*